April 21, 1964      O. BRADLEY      3,129,918
ADJUSTABLE INDICATOR HOLDER
Filed March 28, 1963      2 Sheets-Sheet 2
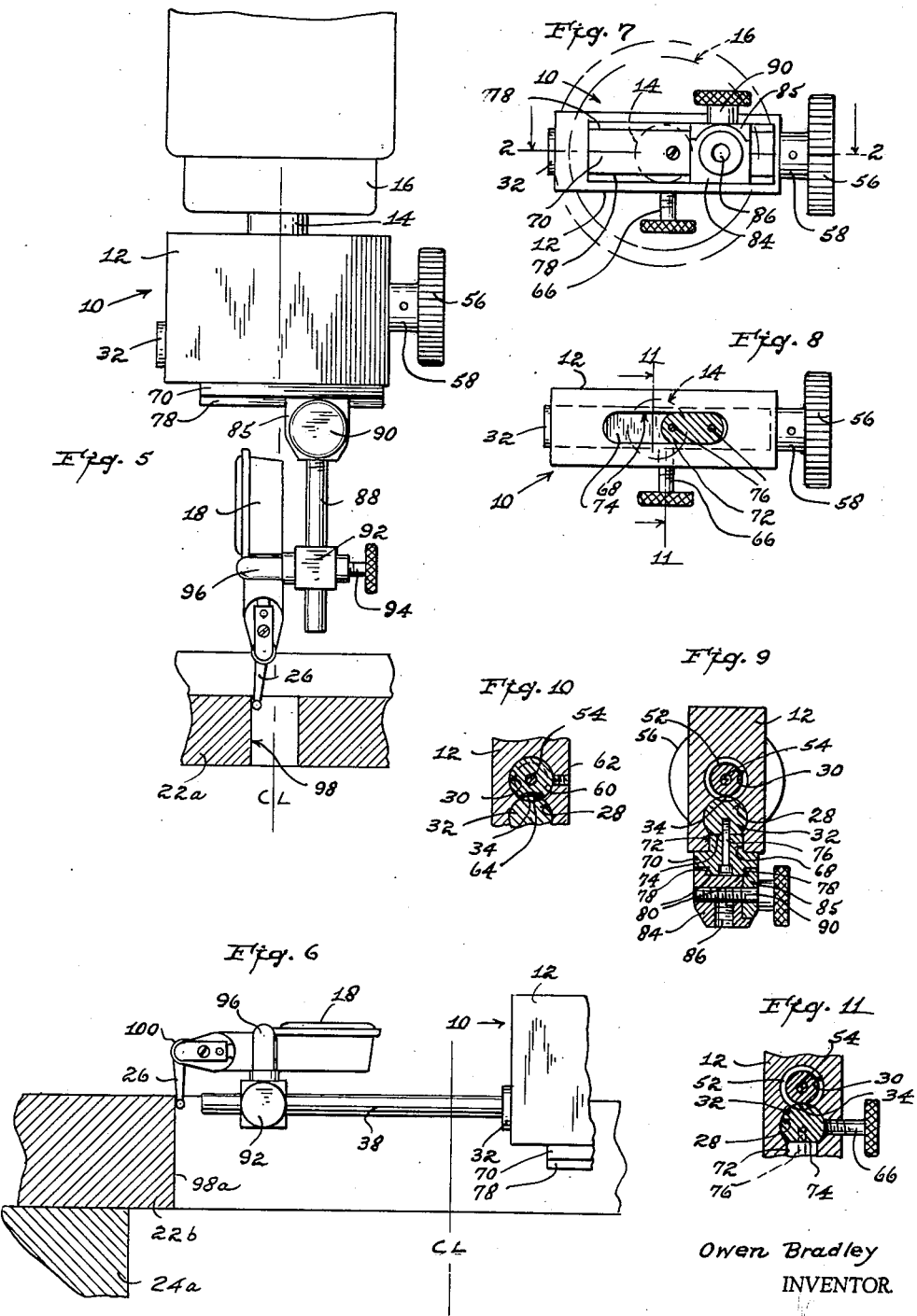
Owen Bradley
INVENTOR.
BY *J. M. Null*
ATTORNEY ң
United States Patent Office 3,129,918
Patented Apr. 21, 1964

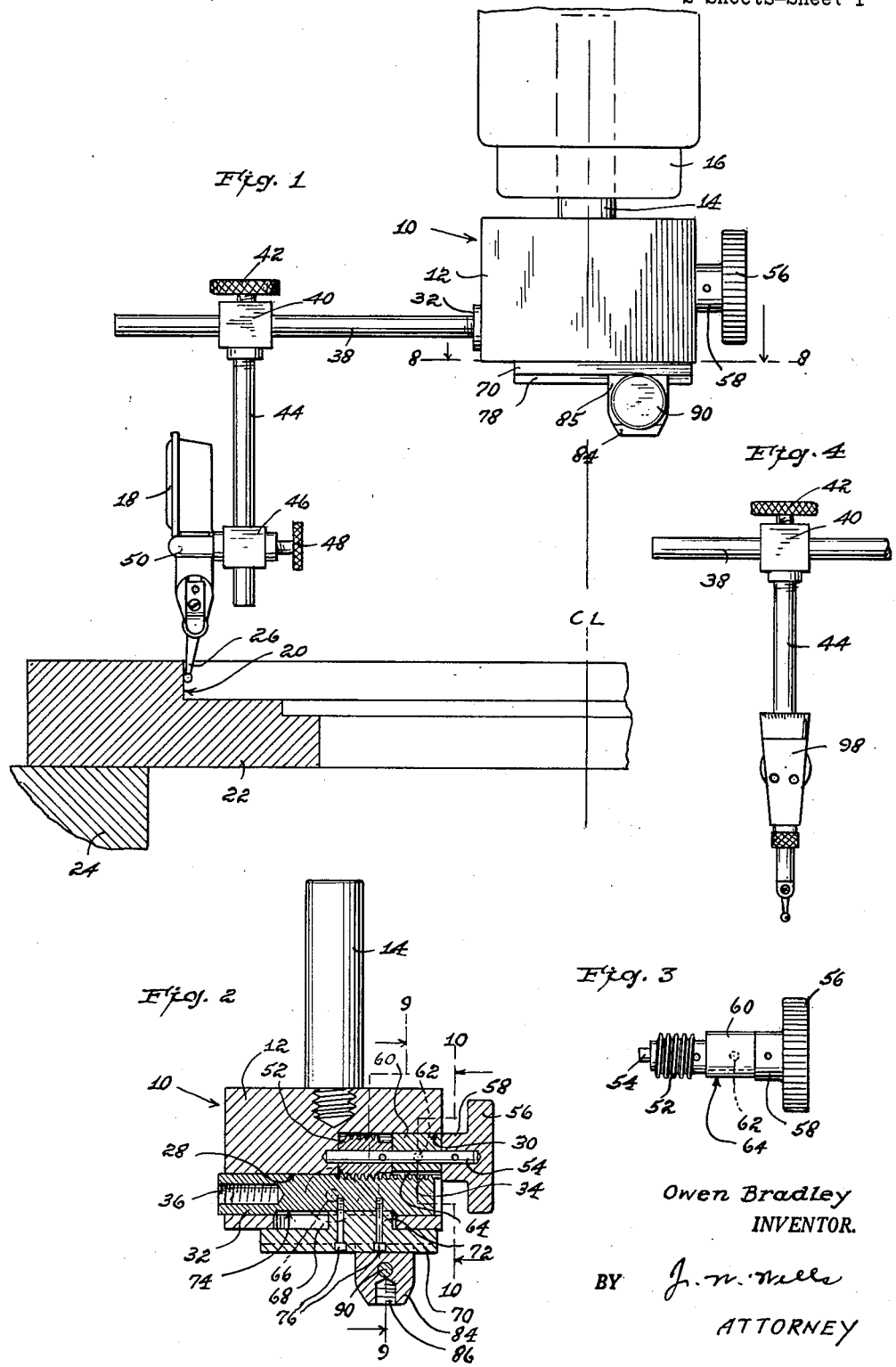

3,129,918
ADJUSTABLE INDICATOR HOLDER
Owen Bradley, Box 2190, Rte. 2, Browns Mills, N.J.
Filed Mar. 28, 1963, Ser. No. 268,793
10 Claims. (Cl. 248—276)

This invention relates to holders for linear indicators of the dial or other designs having a graduated reading face and a rotatable pointer actuated by a finger or plunger in contact with a work piece to indicate the readings in finding the center of an opening or for gauging the outer circumference or perimeter of a work piece and having means for attachment to the spindle of a boring mill or the like.

One of the principal objects of the present invention is to provide an indicator holder of the character mentioned having not only means for adjustment of the contact element through a wide range but also having cooperative means for effecting minute and precise adjustments of the contact element after the general adjustment has been made.

Another object of this invention is to provide an indicator holder of the character mentioned having means adapted for the precise gauging of an opening or surface of a large circumference or perimeter and also having means in the same holder suitable for the precise gauging of small holes or perimeters.

A further object of the invention is to provide an indicator holder in which the indicator can be held with its reading face in either a vertical or a horizontal position.

A still further object of the invention is to provide an adjustable indicator having the advantageous features mentioned in which the indicator supporting rods or other suitable elongated supporting members of various lengths attachable to the holder and the adjustable fittings for such members and auxiliary members are of conventional design and available in the market, thereby rendering the holder with a supply of essential attachments for gauging a wide range of machine work very economical.

Other objects and advantages of my improved adjustable indicator holder will be apparent or pointed out in the following specification in which reference is had to the accompanying drawings forming a part thereof, and in which FIG. 1 is a side elevation of one form of my improved indicator holder with the indicator held in position for finding the center of a large bore or hole;

FIG. 2 is a central section of the holder shown in FIG. 1, taken on the line 2—2 of the bottom plan view FIG. 7, but in upright position;

FIG. 3 is a view of the plunger actuating worm assembly;

FIG. 4 is a view showing a different design of indicator held in my improved indicator holder;

FIG. 5 is a view similar to FIG. 1 but showing the indicator held in position for finding the center of a small hole;

FIG. 6 is a detail view showing the indicator held with its reading face in a horizontal position;

FIG. 7 is a bottom plan view of the holder shown in the previous views;

FIG. 8 is a section taken on the line 8—8 of FIG. 1;

FIG. 9 is a section taken on the line 9—9 of FIG. 2;

FIG. 10 is a detail section taken on the line 10—10 of FIG. 2; and

FIG. 11 is a detail section taken on the line 11—11 of FIG. 8.

Referring to the drawings in which like numerals designate like parts or elements in the several views, my improved indicator holder, designated generally by the numeral 10, includes a solid body member 12 made of metal or other suitable material which, in the form illustrated, is of rectangular shape, but which may be of other desired shape, such, for example, as cylindrical. Also, as illustrated, the body member 12 is provided with a vertical stem 14 for attachment in the spindle chuck 16 of a boring machine or the like. However, it should be understood that my invention resides primarily in the features of minute adjustment mounted in the body member 12, which features are especially advantageous in the use of various conventional designs of linear indicators having graduated reading faces and rotatable pointers actuated by elements in contact with work to be gauged. Accordingly, the body member 12 may be provided with any suitable means for attaching it to a movable or a stationary support, according to the machine work to be gauged.

In FIG. 1 the holder 10 is shown holding a dial type of indicator 18 in a vertical position for finding the center of a bore or hole 20 in a plate 22 mounted on a movable support 24 of a boring mill. The indicator has a contact finger 26 in contact with the edge of the hole. The center of the hole is found by setting the dial pointer (not shown) at zero and moving the support 24 together with the plate 22 and adjusting the indicator 18 until the pointer remains at zero during an entire rotation of the spindle chuck 16. The same procedure would be followed in finding the center of a square or other hole of any regular polygonal shape.

The interior construction of the holder 10 includes a through opening 28 in the body member 12, as shown in FIGS. 2, 9, 10 and 11. Although this opening is shown as being circular, it may be of square or any other desired cross-sectional shape. The interior construction also includes a bore 30 extending partially through the body member 12 in perimetrically contiguous relation with the through opening 28. A plunger 32 is slidably mounted in the through opening 28 in close inter-fitting relation therewith. Obviously, if the opening were polygonal in cross-section the plunger would be of the same shape. The plunger has a row of worm teeth 34 extending from one end a substantial distance along its upper longitudinal edge and has at its other end a threaded opening 36 or other suitable means for attachment thereto of a horizontal indicator supporting rod 38, or other suitable elongated bar or member on which is slidably mounted a clamp 40 having a set screw 42 for locking it in adjusted position on the supporting rod or member 38 and having means at its lower end for supporting a vertical rod or bar 44 on which is slidably mounted another clamp 46 having a locking screw 48 and a lateral collar 50 engaging the neck portion of the indicator 18 with the contact finger 26 in contact with the bore or hole 20.

Mounted in the partial bore 30 is a worm 52, which, as shown in FIG. 2 is in engagement with the worm teeth 34. This worm is also mounted on a central shaft 54, to which it is pinned or otherwise rigidly attached. This shaft projects axially and outwardly from the open end of the bore 30 and has a hand knob 56, or other suitable handle, with a hub portion 58 rigidly attached to the shaft 54 for rotating the worm 52. A thrust sleeve bearing 60 is freely mounted on the shaft 54 between the outer end of the worm 52 and the inner end of the knob portion 58 and rigidly secured to the body member 12 by means of a set-screw 62 (FIG. 10). The lower side of this sleeve is of concave formation, as indicated at 64 (FIGS. 2 and 10) to clear the teeth 34 of the plunger 32 and thus prevent obstruction to the free axial movement of the plunger. As shown in FIG. 2 the inner end of the worm 52 abuts the inner end of the partial bore 30 so that the worm 52 is positively held against axial movement, while effecting axial movement of the plunger 32 in either direction.

The bottom surface of the body member 12 is flat and provided with an elongated slot 68 parallel with and communicating with the through opening 28. An elongated mounting plate 70 adapted for slidable contact with the flat surface has a relatively short rectilinear projection 72 slidably mounted in said slot with its top surface in contact with a flat surface 74 on the bottom side of the plunger 32, to which it is rigidly attached by means of screws 76 projecting through openings in the projection 72 into the plunger, or by other suitable fastening means. The bottom of the mounting plate 70 is provided at its edges with inclined flanges 78 (FIG. 9) engageable with complementary slots 80 and 82 respectively in a carrier member 84 and in a clamping plate 85, the carrier members being provided with a threaded opening 86 in its lower end for attachment thereto of a vertical rod or bar 88 (FIG. 5) threaded at its upper end for engagement with the opening 86. The carrier 84 is held in slidably adjusted position by means of a clamping screw 90 projecting through the clamping plate 85 into the carrier 84. As shown in FIG. 5, a clamp 92 is slidably mounted on the rod 88 and has a set screw 94 to lock it in vertically adjusted position on the rod 88. The clamp 92 is provided with a lateral connection 96 for engagement with the neck of the indicator 18 to hold it in a vertical position. This arrangement is especially advantageous in finding the center of a small hole 98 in the plate 22, or for making other gaugings of small holes or projecting surfaces. The slot 68 is of substantially greater length than the projection 72 to permit ample axial movement of the plunger 32 and the mounting plate 70. The plunger 32 can be locked in any adjusted position by means of a set screw 66 in the body member 12.

From the foregoing description it will be seen that my improved indicator holder is advantageous in holding the same type of indicator for finding centers or making gaugings of openings or projections of large diameters or perimeters and also for gauging small holes or projections. The usual conventional rods of various convenient lengths and adjustable clamps on the supporting rods or bars can be used for making the approximate gaugings and the worm and plunger feature then used for effecting the final minute and precise adjustments of the indicator. As illustrated, the worm 52 is provided with left hand threads, so that when rotated to the right it will move the plunger inwardly. However, the threads may be either left or right hand.

As shown in FIG. 4, another design of graduated face indicator 98 may be adjustably mounted on the rod or bar 38 (FIG. 1) in the same manner as the indicator 18.

As shown in FIG. 6, the indicator 18 may be mounted on the rod or bar 38 in a horizontal, or reading face up, position by adjusting the contact finger 26 to a right or other suitable angle by means of the ratchet pivot 100 provided in such conventional indicators.

Therefore, my improved indicator has practically a universal adaptability to the use of linear indicators of the various conventional makes and designs having a reading face and a rotating pointer through a wide range of adjustability and terminating in a minute and precise gauging of various kinds of machine work.

Obviously various changes or modifications may be made in my improved indicator without departing from the spirit or scope of my invention. Therefore, it should be understood that the embodiments of my invention shown and described are intended to be illustrative only and restricted only by the appended claims.

I claim:

1. An adjustable indicator holder of the character described comprising, in combination, a solid body member having means for attaching it to a support, a through opening in said body member and a plunger axially mounted in said opening, said plunger having a row of worm teeth extending from one end a substantial distance along its longitudinal edge, said plunger having means at its other end for attachment thereto of an elongated horizontal indicator supporting member, said body member having a bore extending partially therethrough in perimetrically contiguous relation with said through opening; and a worm axially mounted in said partial bore in engagement with said worm teeth for effecting axial movement of said plunger together with said indicator supporting member in either direction, said worm having an operating shaft projecting axially and outwardly from the open end of said partial bore, said shaft being provided with manually operable means for rotating it together with said worm in either direction.

2. An adjustable indicator holder as in claim 1 and including a set screw in said body member engageable with said plunger for locking it in any adjusted position.

3. An adjustable indicator holder as in claim 1, in which the bottom surface of the body member is flat and provided with an elongated slot parallel with and communicating with said through opening, an elongated mounting plate adapted for slidable contact with said flat surface of the body member, said mounting plate including a relatively short rectilinear projection slidably mounted in said slot with its top surface in contact with the bottom surface of said plunger and provided with means for rigidly attaching it together with said mounting plate to said plunger, a carrier member having means at its lower end for attachment thereto of a vertical and elongated indicator supporting member, said carrier member having means coengageable with means on said mounting plate for mounting said carrier member on said plate in longitudinally slidable relation therewith.

4. An adjustable indicator holder as in claim 1 in which the means for attachment of the plunger to the horizontal indicator supporting member consist of threaded means at the end of the plunger coengageable with threaded means at the adjacent end of said supporting member.

5. An adjustable indicator holder as in claim 1 in which the means for attachment of the plunger to the horizontal indicator supporting member consist of a threaded opening in the end of the plunger coengageable with threads on the adjacent end of said supporting member.

6. An adjustable indicator holder as in claim 1 and including a clamp slidably mounted on the horizontal indicator supporting member, said clamp having a set screw for locking it in adjusted position on said member and having threaded means at its lower end for attachment thereto of a vertical indicator supporting member, a clamp slidably mounted on said member and having a set screw for locking it in adjusted position on said member, said clamp being provided with means for engagement with a graduated reading face type of linear indicator for holding said indicator with its face in vertical position.

7. An adjustable indicator holder as in claim 1 and including a clamp slidably mounted on the horizontal indicator supporting member, said clamp having a set screw for locking it in adjusted positions on said member and having upwardly projecting means for engagement with a graduated reading face type of linear indicator for holding said indicator with its reading face in a horizontal position.

8. An adjustable indicator holder as in claim 3 in which the means for attachment of the vertical supporting member to the carrier consist of threaded means at the lower end of said carrier coengageable with threaded means at the adjacent end of said supporting member.

9. An adjustable indicator holder as in claim 3 in which the means for attachment of the vertical supporting member to the carrier consist of a threaded opening in the lower end of said carrier coengageable with threads on the adjacent end of said member.

10. An adjustable indicator holder as in claim 3 and including a clamp slidably mounted on the vertical indicator supporting member, said clamp having a set screw for locking it in an adjusted position on said member and having laterally projecting means for engagement with a graduated reading face type of linear indicator for holding said indicator with its face in a vertical position.

References Cited in the file of this patent
UNITED STATES PATENTS

| | | |
|---|---|---|
| 2,601,965 | Scalise | July 1, 1952 |
| 2,627,118 | Young | Feb. 3, 1953 |
| 3,029,520 | Reeves | Apr. 17, 1962 |